United States Patent

Sakamoto

Patent Number: 6,092,920
Date of Patent: *Jul. 25, 2000

[54] METHOD FOR ARRANGING PIXELS TO FACILITATE COMPRESSION/EXTENSION OF IMAGE DATA

[75] Inventor: Tadashi Sakamoto, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/906,474

[22] Filed: Aug. 5, 1997

[30] Foreign Application Priority Data

Apr. 2, 1997 [JP] Japan ................................. 9-083754

[51] Int. Cl.[7] ................................................ G06F 17/14
[52] U.S. Cl. ........................................................ 364/725.02
[58] Field of Search .......................................... 364/725.02

[56] References Cited

U.S. PATENT DOCUMENTS

| | | | |
|---|---|---|---|
| 5,031,038 | 7/1991 | Guillemot et al. | 364/725.02 |
| 5,268,853 | 12/1993 | Tanaka et al. | 364/725.02 |
| 5,359,549 | 10/1994 | Tanaka et al. | 364/725.02 |
| 5,387,982 | 2/1995 | Kitaura et al. | 364/725.02 |
| 5,583,803 | 12/1996 | Matsumoto et al. | 364/725.02 |
| 5,610,849 | 3/1997 | Huang | 364/725.02 |

FOREIGN PATENT DOCUMENTS 7-162859   6/1995   Japan .

OTHER PUBLICATIONS

The University of California, Public Domain, MPEG Video Software version 2.0, Jan. 27, 1993.
Independent JPEG Group, Public Domain, JPEG Software release 61, Feb. 7, 1996.

*Primary Examiner*—David H. Malzahn
*Attorney, Agent, or Firm*—Burns, Doane, Swecker & Mathis, LLP

[57] ABSTRACT

When a two-dimensional DCT is divided into first and second one-dimensional DCTs, a plurality of intermediate results obtained by the first one-dimensional DCT can be read out at a time. Intermediate results $\phi(x, v)$ are arranged in a new matrix M1 along columns, not rearranged in the same matrix in place of pixel values $f(x, y)$, so that the intermediate results $\phi(x, v)$ can be read out along rows in the second one-dimensional DCT. That is, the intermediate results can be read out consecutively, or all together if the width of processable bits in hardware or software which performs the DCT is large enough. Further, when u=v, necessary data for process is located in the same row both in the matrices M1 and M2, which enables consecutive readout of the data.

27 Claims, 11 Drawing Sheets

FIG. 1

| | | | | | | | | |
|---|---|---|---|---|---|---|---|---|
| M2 | D(0,7) | D(1,7) | D(2,7) | D(3,7) | D(4,7) | D(5,7) | D(6,7) | D(7,7) |
| | D(0,6) | D(1,6) | D(2,6) | D(3,6) | D(4,6) | D(5,6) | D(6,6) | D(7,6) |
| | D(0,5) | D(1,5) | D(2,5) | D(3,5) | D(4,5) | D(5,5) | D(6,5) | D(7,5) |
| | D(0,4) | D(1,4) | D(2,4) | D(3,4) | D(4,4) | D(5,4) | D(6,4) | D(7,4) |
| | D(0,3) | D(1,3) | D(2,3) | D(3,3) | D(4,3) | D(5,3) | D(6,3) | D(7,3) |
| | D(0,2) | D(1,2) | D(2,2) | D(3,2) | D(4,2) | D(5,2) | D(6,2) | D(7,2) |
| | D(0,1) | D(1,1) | D(2,1) | D(3,1) | D(4,1) | D(5,1) | D(6,1) | D(7,1) |
| | D(0,0) | D(1,0) | D(2,0) | D(3,0) | D(4,0) | D(5,0) | D(6,0) | D(7,0) |
| M1 | | | | | | | | |

FIG. 2

| M1 | | | | | | | | M2 | | | | | | | |
|---|---|---|---|---|---|---|---|---|---|---|---|---|---|---|---|
| φ(0,0) | φ(1,0) | φ(2,0) | φ(3,0) | φ(4,0) | φ(5,0) | φ(6,0) | φ(7,0) | D(0,0) | D(0,1) | D(0,2) | D(0,3) | D(0,4) | D(0,5) | D(0,6) | D(0,7) |
| φ(0,1) | φ(1,1) | φ(2,1) | φ(3,1) | φ(4,1) | φ(5,1) | φ(6,1) | φ(7,1) | D(1,0) | D(1,1) | D(1,2) | D(1,3) | D(1,4) | D(1,5) | D(1,6) | D(1,7) |
| φ(0,2) | φ(1,2) | φ(2,2) | φ(3,2) | φ(4,2) | φ(5,2) | φ(6,2) | φ(7,2) | D(2,0) | D(2,1) | D(2,2) | D(2,3) | D(2,4) | D(2,5) | D(2,6) | D(2,7) |
| φ(0,3) | φ(1,3) | φ(2,3) | φ(3,3) | φ(4,3) | φ(5,3) | φ(6,3) | φ(7,3) | D(3,0) | D(3,1) | D(3,2) | D(3,3) | D(3,4) | D(3,5) | D(3,6) | D(3,7) |
| φ(0,4) | φ(1,4) | φ(2,4) | φ(3,4) | φ(4,4) | φ(5,4) | φ(6,4) | φ(7,4) | D(4,0) | D(4,1) | D(4,2) | D(4,3) | D(4,4) | D(4,5) | D(4,6) | D(4,7) |
| φ(0,5) | φ(1,5) | φ(2,5) | φ(3,5) | φ(4,5) | φ(5,5) | φ(6,5) | φ(7,5) | D(5,0) | D(5,1) | D(5,2) | D(5,3) | D(5,4) | D(5,5) | D(5,6) | D(5,7) |
| φ(0,6) | φ(1,6) | φ(2,6) | φ(3,6) | φ(4,6) | φ(5,6) | φ(6,6) | φ(7,6) | D(6,0) | D(6,1) | D(6,2) | D(6,3) | D(6,4) | D(6,5) | D(6,6) | D(6,7) |
| φ(0,7) | φ(1,7) | φ(2,7) | φ(3,7) | φ(4,7) | φ(5,7) | φ(6,7) | φ(7,7) | D(7,0) | D(7,1) | D(7,2) | D(7,3) | D(7,4) | D(7,5) | D(7,6) | D(7,7) |

FIG. 3

| F(0,0) | F(0,1) | F(0,2) | F(0,3) | F(0,4) | F(0,5) | F(0,6) | F(0,7) |
|---|---|---|---|---|---|---|---|
| F(1,0) | F(1,1) | F(1,2) | F(1,3) | F(1,4) | F(1,5) | F(1,6) | F(1,7) |
| F(2,0) | F(2,1) | F(2,2) | F(2,3) | F(2,4) | F(2,5) | F(2,6) | F(2,7) |
| F(3,0) | F(3,1) | F(3,2) | F(3,3) | F(3,4) | F(3,5) | F(3,6) | F(3,7) |
| F(4,0) | F(4,1) | F(4,2) | F(4,3) | F(4,4) | F(4,5) | F(4,6) | F(4,7) |
| F(5,0) | F(5,1) | F(5,2) | F(5,3) | F(5,4) | F(5,5) | F(5,6) | F(5,7) |
| F(6,0) | F(6,1) | F(6,2) | F(6,3) | F(6,4) | F(6,5) | F(6,6) | F(6,7) |
| F(7,0) | F(7,1) | F(7,2) | F(7,3) | F(7,4) | F(7,5) | F(7,6) | F(7,7) |

| M11 | | | | M21 | | | | M12 | | | | M22 | | | |
|---|---|---|---|---|---|---|---|---|---|---|---|---|---|---|---|
| φ(0,0) | φ(1,0) | φ(2,0) | φ(3,0) | D(0,0) | D(0,1) | D(0,2) | D(0,3) | φ(4,0) | φ(5,0) | φ(6,0) | φ(7,0) | D(0,4) | D(0,5) | D(0,6) | D(0,7) |
| φ(0,1) | φ(1,1) | φ(2,1) | φ(3,1) | D(1,0) | D(1,1) | D(1,2) | D(1,3) | φ(4,1) | φ(5,1) | φ(6,1) | φ(7,1) | D(1,4) | D(1,5) | D(1,6) | D(1,7) |
| φ(0,2) | φ(1,2) | φ(2,2) | φ(3,2) | D(2,0) | D(2,1) | D(2,2) | D(2,3) | φ(4,2) | φ(5,2) | φ(6,2) | φ(7,2) | D(2,4) | D(2,5) | D(2,6) | D(2,7) |
| φ(0,3) | φ(1,3) | φ(2,3) | φ(3,3) | D(3,0) | D(3,1) | D(3,2) | D(3,3) | φ(4,3) | φ(5,3) | φ(6,3) | φ(7,3) | D(3,4) | D(3,5) | D(3,6) | D(3,7) |
| φ(0,4) | φ(1,4) | φ(2,4) | φ(3,4) | D(4,0) | D(4,1) | D(4,2) | D(4,3) | φ(4,4) | φ(5,4) | φ(6,4) | φ(7,4) | D(4,4) | D(4,5) | D(4,6) | D(4,7) |
| φ(0,5) | φ(1,5) | φ(2,5) | φ(3,5) | D(5,0) | D(5,1) | D(5,2) | D(5,3) | φ(4,5) | φ(5,5) | φ(6,5) | φ(7,5) | D(5,4) | D(5,5) | D(5,6) | D(5,7) |
| φ(0,6) | φ(1,6) | φ(2,6) | φ(3,6) | D(6,0) | D(6,1) | D(6,2) | D(6,3) | φ(4,6) | φ(5,6) | φ(6,6) | φ(7,6) | D(6,4) | D(6,5) | D(6,6) | D(6,7) |
| φ(0,7) | φ(1,7) | φ(2,7) | φ(3,7) | D(7,0) | D(7,1) | D(7,2) | D(7,3) | φ(4,7) | φ(5,7) | φ(6,7) | φ(7,7) | D(7,4) | D(7,5) | D(7,6) | D(7,7) |

FIG. 5

| | | | | | | | |
|---|---|---|---|---|---|---|---|
| F**(0,0) | F**(0,1) | F**(0,2) | F**(0,3) | F**(0,4) | F**(0,5) | F**(0,6) | F**(0,7) |
| F**(1,0) | F**(1,1) | F**(1,2) | F**(1,3) | F**(1,4) | F**(1,5) | F**(1,6) | F**(1,7) |
| F(2,0) | F(2,1) | F(2,2) | F(2,3) | F(2,4) | F(2,5) | F(2,6) | F(2,7) |
| F(3,0) | F(3,1) | F(3,2) | F(3,3) | F(3,4) | F(3,5) | F(3,6) | F(3,7) |
| F(4,0) | F(4,1) | F(4,2) | F(4,3) | F(4,4) | F(4,5) | F(4,6) | F(4,7) |
| F(5,0) | F(5,1) | F(5,2) | F(5,3) | F(5,4) | F(5,5) | F(5,6) | F(5,7) |
| F(6,0) | F(6,1) | F(6,2) | F(6,3) | F(6,4) | F(6,5) | F(6,6) | F(6,7) |
| F(7,0) | F(7,1) | F(7,2) | F(7,3) | F(7,4) | F(7,5) | F(7,6) | F(7,7) |

| | | | | | | | |
|---|---|---|---|---|---|---|---|
| Ψ(0,0) | Ψ(1,0) | Ψ(2,0) | Ψ(3,0) | Ψ(4,0) | Ψ(5,0) | Ψ(6,0) | Ψ(7,0) |
| Ψ(0,1) | Ψ(1,1) | Ψ(2,1) | Ψ(3,1) | Ψ(4,1) | Ψ(5,1) | Ψ(6,1) | Ψ(7,1) |
| Ψ(0,2) | Ψ(1,2) | Ψ(2,2) | Ψ(3,2) | Ψ(4,2) | Ψ(5,2) | Ψ(6,2) | Ψ(7,2) |
| Ψ(0,3) | Ψ(1,3) | Ψ(2,3) | Ψ(3,3) | Ψ(4,3) | Ψ(5,3) | Ψ(6,3) | Ψ(7,3) |
| Ψ(0,4) | Ψ(1,4) | Ψ(2,4) | Ψ(3,4) | Ψ(4,4) | Ψ(5,4) | Ψ(6,4) | Ψ(7,4) |
| Ψ(0,5) | Ψ(1,5) | Ψ(2,5) | Ψ(3,5) | Ψ(4,5) | Ψ(5,5) | Ψ(6,5) | Ψ(7,5) |
| Ψ(0,6) | Ψ(1,6) | Ψ(2,6) | Ψ(3,6) | Ψ(4,6) | Ψ(5,6) | Ψ(6,6) | Ψ(7,6) |
| Ψ(0,7) | Ψ(1,7) | Ψ(2,7) | Ψ(3,7) | Ψ(4,7) | Ψ(5,7) | Ψ(6,7) | Ψ(7,7) |

TWO-DIMENSIONAL TRANSFORM VALUE F*(u, v)

| v= | 0 | 1 | 2 | 3 | 4 | 5 | 6 | 7 |
|---|---|---|---|---|---|---|---|---|
| u=0 | 1 | 2 | 6 | 7 | 15 | 16 | 28 | 29 |
| 1 | 3 | 5 | 8 | 14 | 17 | 27 | 30 | 43 |
| 2 | 4 | 9 | 13 | 18 | 26 | 31 | 42 | 44 |
| 3 | 10 | 12 | 19 | 25 | 32 | 41 | 45 | 54 |
| 4 | 11 | 20 | 24 | 33 | 40 | 46 | 53 | 55 |
| 5 | 21 | 23 | 34 | 39 | 47 | 52 | 56 | 61 |
| 6 | 22 | 35 | 38 | 48 | 51 | 57 | 60 | 62 |
| 7 | 36 | 37 | 49 | 50 | 58 | 59 | 63 | 64 |

ONE-DIMENTIONAL ARRAY

| 1 | 2 | 3 | 4 | 5 | 6 | 7 | 8 | ... | 58 | 59 | 60 | 61 | 62 | 63 | 64 |

FIG. 10

| f(0,0) | f(0,1) | f(0,2) | f(0,3) | f(0,4) | f(0,5) | f(0,6) | f(0,7) |
|---|---|---|---|---|---|---|---|
| f(1,0) | f(1,1) | f(1,2) | f(1,3) | f(1,4) | f(1,5) | f(1,6) | f(1,7) |
| f(2,0) | f(2,1) | f(2,2) | f(2,3) | f(2,4) | f(2,5) | f(2,6) | f(2,7) |
| f(3,0) | f(3,1) | f(3,2) | f(3,3) | f(3,4) | f(3,5) | f(3,6) | f(3,7) |
| f(4,0) | f(4,1) | f(4,2) | f(4,3) | f(4,4) | f(4,5) | f(4,6) | f(4,7) |
| f(5,0) | f(5,1) | f(5,2) | f(5,3) | f(5,4) | f(5,5) | f(5,6) | f(5,7) |
| f(6,0) | f(6,1) | f(6,2) | f(6,3) | f(6,4) | f(6,5) | f(6,6) | f(6,7) |
| f(7,0) | f(7,1) | f(7,2) | f(7,3) | f(7,4) | f(7,5) | f(7,6) | f(7,7) |

FIG. 11

| $\phi(0,0)$ | $\phi(0,1)$ | $\phi(0,2)$ | $\phi(0,3)$ | $\phi(0,4)$ | $\phi(0,5)$ | $\phi(0,6)$ | $\phi(0,7)$ |
|---|---|---|---|---|---|---|---|
| f(1,0) | f(1,1) | f(1,2) | f(1,3) | f(1,4) | f(1,5) | f(1,6) | f(1,7) |
| f(2,0) | f(2,1) | f(2,2) | f(2,3) | f(2,4) | f(2,5) | f(2,6) | f(2,7) |
| f(3,0) | f(3,1) | f(3,2) | f(3,3) | f(3,4) | f(3,5) | f(3,6) | f(3,7) |
| f(4,0) | f(4,1) | f(4,2) | f(4,3) | f(4,4) | f(4,5) | f(4,6) | f(4,7) |
| f(5,0) | f(5,1) | f(5,2) | f(5,3) | f(5,4) | f(5,5) | f(5,6) | f(5,7) |
| f(6,0) | f(6,1) | f(6,2) | f(6,3) | f(6,4) | f(6,5) | f(6,6) | f(6,7) |
| f(7,0) | f(7,1) | f(7,2) | f(7,3) | f(7,4) | f(7,5) | f(7,6) | f(7,7) |

FIG. 12

| $\phi(0,0)$ | $\phi(0,1)$ | $\phi(0,2)$ | $\phi(0,3)$ | $\phi(0,4)$ | $\phi(0,5)$ | $\phi(0,6)$ | $\phi(0,7)$ |
|---|---|---|---|---|---|---|---|
| $\phi(1,0)$ | $\phi(1,1)$ | $\phi(1,2)$ | $\phi(1,3)$ | $\phi(1,4)$ | $\phi(1,5)$ | $\phi(1,6)$ | $\phi(1,7)$ |
| $\phi(2,0)$ | $\phi(2,1)$ | $\phi(2,2)$ | $\phi(2,3)$ | $\phi(2,4)$ | $\phi(2,5)$ | $\phi(2,6)$ | $\phi(2,7)$ |
| $\phi(3,0)$ | $\phi(3,1)$ | $\phi(3,2)$ | $\phi(3,3)$ | $\phi(3,4)$ | $\phi(3,5)$ | $\phi(3,6)$ | $\phi(3,7)$ |
| $\phi(4,0)$ | $\phi(4,1)$ | $\phi(4,2)$ | $\phi(4,3)$ | $\phi(4,4)$ | $\phi(4,5)$ | $\phi(4,6)$ | $\phi(4,7)$ |
| $\phi(5,0)$ | $\phi(5,1)$ | $\phi(5,2)$ | $\phi(5,3)$ | $\phi(5,4)$ | $\phi(5,5)$ | $\phi(5,6)$ | $\phi(5,7)$ |
| $\phi(6,0)$ | $\phi(6,1)$ | $\phi(6,2)$ | $\phi(6,3)$ | $\phi(6,4)$ | $\phi(6,5)$ | $\phi(6,6)$ | $\phi(6,7)$ |
| $\phi(7,0)$ | $\phi(7,1)$ | $\phi(7,2)$ | $\phi(7,3)$ | $\phi(7,4)$ | $\phi(7,5)$ | $\phi(7,6)$ | $\phi(7,7)$ |

FIG. 13

| $F(0,0)$ | $\phi(0,1)$ | $\phi(0,2)$ | $\phi(0,3)$ | $\phi(0,4)$ | $\phi(0,5)$ | $\phi(0,6)$ | $\phi(0,7)$ |
|---|---|---|---|---|---|---|---|
| $F(1,0)$ | $\phi(1,1)$ | $\phi(1,2)$ | $\phi(1,3)$ | $\phi(1,4)$ | $\phi(1,5)$ | $\phi(1,6)$ | $\phi(1,7)$ |
| $F(2,0)$ | $\phi(2,1)$ | $\phi(2,2)$ | $\phi(2,3)$ | $\phi(2,4)$ | $\phi(2,5)$ | $\phi(2,6)$ | $\phi(2,7)$ |
| $F(3,0)$ | $\phi(3,1)$ | $\phi(3,2)$ | $\phi(3,3)$ | $\phi(3,4)$ | $\phi(3,5)$ | $\phi(3,6)$ | $\phi(3,7)$ |
| $F(4,0)$ | $\phi(4,1)$ | $\phi(4,2)$ | $\phi(4,3)$ | $\phi(4,4)$ | $\phi(4,5)$ | $\phi(4,6)$ | $\phi(4,7)$ |
| $F(5,0)$ | $\phi(5,1)$ | $\phi(5,2)$ | $\phi(5,3)$ | $\phi(5,4)$ | $\phi(5,5)$ | $\phi(5,6)$ | $\phi(5,7)$ |
| $F(6,0)$ | $\phi(6,1)$ | $\phi(6,2)$ | $\phi(6,3)$ | $\phi(6,4)$ | $\phi(6,5)$ | $\phi(6,6)$ | $\phi(6,7)$ |
| $F(7,0)$ | $\phi(7,1)$ | $\phi(7,2)$ | $\phi(7,3)$ | $\phi(7,4)$ | $\phi(7,5)$ | $\phi(7,6)$ | $\phi(7,7)$ |

FIG. 14

| Address | Left | Right |
|---|---|---|
| 0 0 0 0 0 0 0 0 | | |
| 0 0 0 0 0 0 0 4 | | |
| 0 0 0 0 0 0 0 8 | | |

| $\phi(0,0)$ | $\phi(0,1)$ |
|---|---|
| $\phi(0,2)$ | $\phi(0,3)$ |
| $\phi(0,4)$ | $\phi(0,5)$ |
| $\phi(0,6)$ | $\phi(0,7)$ |
| $\phi(1,0)$ | $\phi(1,1)$ |
| $\phi(1,2)$ | $\phi(1,3)$ |
| $\phi(1,4)$ | $\phi(1,5)$ |
| $\phi(1,6)$ | $\phi(1,7)$ |
| $\phi(2,0)$ | $\phi(2,1)$ |

| $\phi(6,6)$ | $\phi(6,7)$ |
|---|---|
| $\phi(7,0)$ | $\phi(7,1)$ |
| $\phi(7,2)$ | $\phi(7,3)$ |
| $\phi(7,4)$ | $\phi(7,5)$ |
| $\phi(7,6)$ | $\phi(7,7)$ |

F F F F F F F F

METHOD FOR ARRANGING PIXELS TO FACILITATE COMPRESSION/EXTENSION OF IMAGE DATA

BACKGROUND OF THE INVENTION

1. Field of the Invention

The present invention is directed to a coding method of an image data, particularly to a compression/extension method including discrete cosine transform and quantization of data.

2. Description of the Background Art

Figure 8:
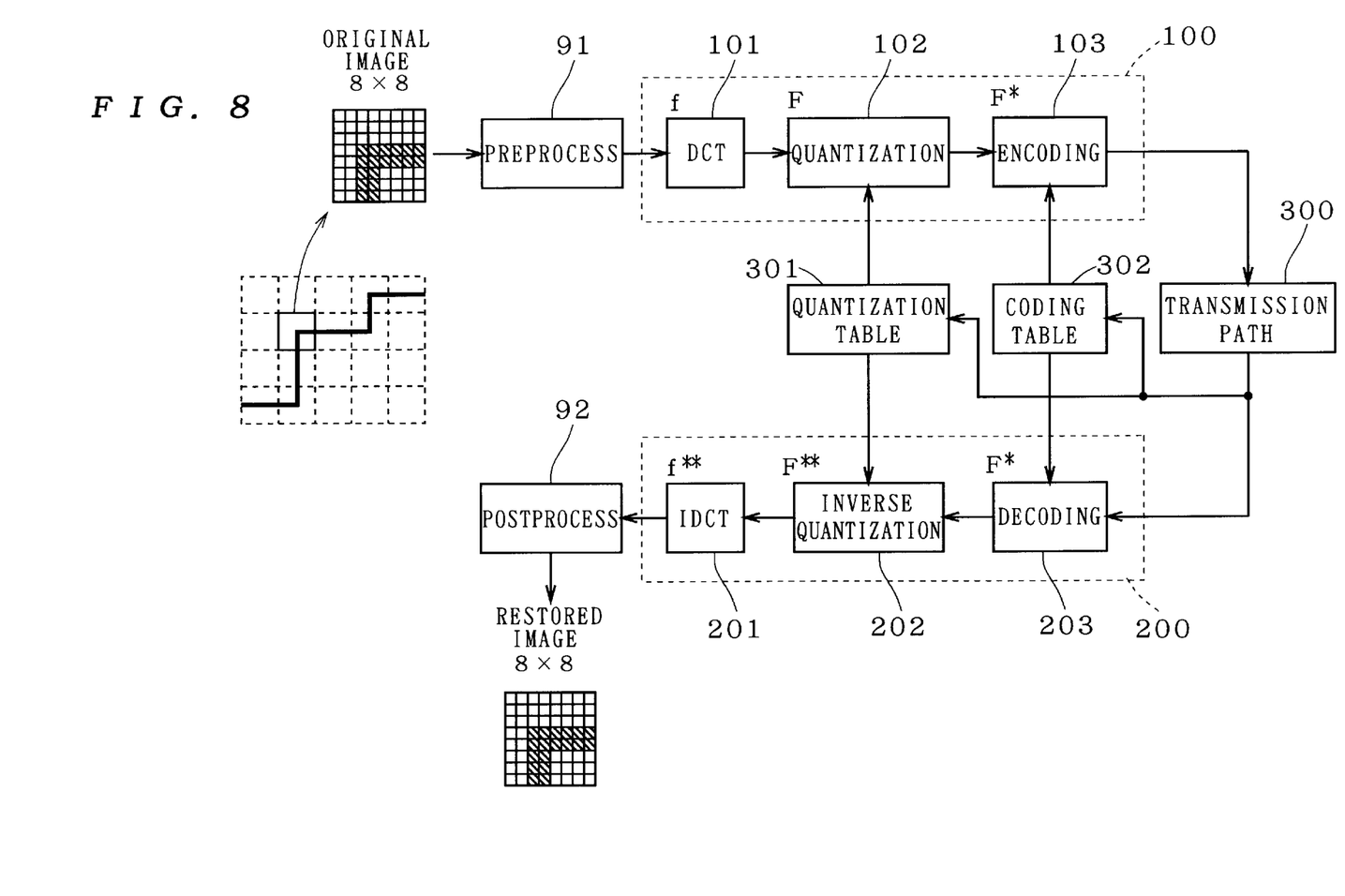
FIG. 8 is a block diagram illustrating an image encoding/decoding process.

FIG. 8 is a block diagram illustrating an image encoding/decoding processing. An original image data is processed in a block of N×N pixels, for example, a block of 8×8 pixels. The pixels are preprocessed in a predetermined way in a preprocess unit 91, and are encoded by an encoder 100. Then, the compressed image data is transmitted through a transmission path 300.

The compressed image data carried through the transmission path 300 is decoded by a decoder 200, and is postprocessed in a predetermined way in a postprocess unit 92 to form a restored image data of 8×8 pixels.

The encoder 100 comprises a discrete cosine transform (DCT) unit 101, a quantization unit 102, and an encoding unit 103. The preprocessed original image data is processed by DCT in the DCT unit 101, is quantized in the quantization unit 102 according to a quantization table 301, and is encoded by entropy coding in the encoding unit 103 according to a coding table 302 while scanned in a predetermined order.

In the entropy coding, coding based on zero run length has been well known. Thus, in order to have a longer sequence of zeroes in data to be coded (quantized data), the quantized data is zigzag scanned in order of its frequency in the DCT operations from low to high.

The decoder 200 comprises an inverse discrete cosine transform (IDCT) unit 201, an inverse quantization unit 202, and a decoding unit 203. The compressed image data is decoded in the decoding unit 203 according to the coding table 302 while scanned in a predetermined order, is inversely quantized in the inverse quantization unit 202 according to the quantization table 301, and is processed by IDCT in the IDCT unit 201.

Such encoding and decoding technique has been applied to a typical image processing method such as JPEG as a standard for compressing information of a color static image and MPEG1 as a standard for coding a dynamic image.

In the JPEG, for example, a two-dimensional DCT is practiced on the original image data of 8×8 pixels as described above. Suppose that a pixel value in the xth row and the yth column of the preprocessed original image data of 8×8 pixels is expressed as f(x, y), the two-dimensional DCT derives 8×8 transform values F(u, v) as follows:

$$F(u, v) = \frac{2}{N} C(u)C(v) \sum_{x=0}^{N-1} \sum_{y=0}^{N-1} f(x, y) \cos\left(\frac{\pi u(2x+1)}{2N}\right) \cos\left(\frac{\pi v(2y+1)}{2N}\right) \quad (1)$$

where:

$$C(i) = \begin{cases} \frac{1}{\sqrt{2}} & (i = 0) \\ 1 & (i \neq 0) \end{cases} \quad (2)$$

where x, y, u, v=0 to N, and N=8.

Orthogonality of the DCT allows division of the two-dimensional DCT into first and second one-dimensional DCTs. More specifically, applying variable v to f(x, y) instead of variable y, intermediate results φ(x, v) are found by the following equation (3) indicating the first one-dimensional DCT:

$$\phi(x, v) = \sqrt{\frac{2}{N}} C(v) \sum_{y=0}^{N-1} f(x, y) \cos\left(\frac{\pi v(2y+1)}{2N}\right) \quad (3)$$

Then, applying variable u to the intermediate results φ(x, v) instead of variable x, the transform values F(u, v) are found by the following equation (4) indicating the second one-dimensional DCT:

$$F(u, v) = \sqrt{\frac{2}{N}} C(u) \sum_{x=0}^{N-1} \phi(x, v) \cos\left(\frac{\pi u(2x+1)}{2N}\right) \quad (4)$$

Figure 9:
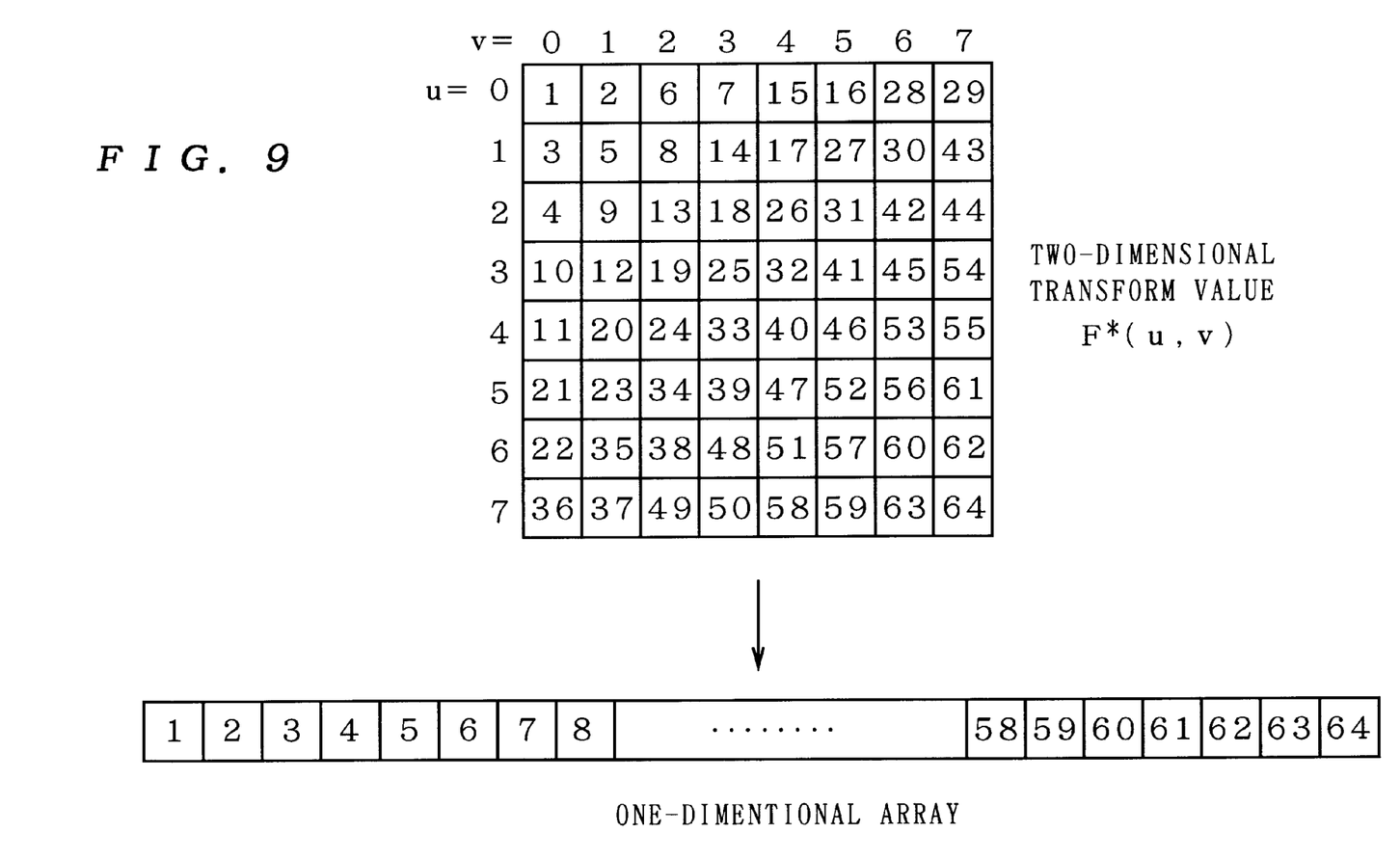
FIG. 9 is a schematic diagram showing the order of zigzag scanning.

The 8×8 transform values F(u, v) found in this way is quantized by dividing them by a quantization coefficient prescribed according to the quantization table 301. In the JPEG, the resultant 8×8 transform values F*(u, v) (quantized data) are zigzag scanned to be transformed into a one-dimensional array. FIG. 9 schematically shows the order of the zigzag scanning. The numbers allotted to 8×8 squares indicate a sequence of the one-dimensional array.

The one-dimensional array is encoded by Huffman encoding for transforming an object to be coded in accordance with its rate of occurance, allotting a shorter code when the frequency is higher, with non-zero elements and zero run length (the number of consecutive zero elements) as a pair.

The reverse of the encoding is decoding. Reversely following the procedure shown in FIG. 9, the one-dimensional array is decoded by Huffman decoding to be arranged in an 8×8 matrix (hereinafter referred to as "inverse zigzag scanning"). If the decoding is perfectly operated, the transform values F*(u, v) can be obtained.

In the inverse quantization, the transform values F*(u, v) are multiplied by the quantization coefficient prescribed according to the quantization table 301 to form restored transform values F(u, v). In general, there is a quantization error between the transform values F(u, v) and F(u, v).

The IDCT requires the two-dimensional procedures as well as the DCT, which is expressed as follows:

$$f^{**}(x, y) = \quad (5)$$
$$\frac{2}{N} \sum_{u=0}^{N-1} \sum_{v=0}^{N-1} C(u)C(v) F^{**}(u, v) \cos\left(\frac{\pi u(2x+1)}{2N}\right) \cos\left(\frac{\pi v(2y+1)}{2N}\right)$$

where the transform value f**(x, y) is a pixel value in the xth row and the yth column of the restored image data of 8×8 pixels before postprocessed.

The IDCT allows division of the two-dimensional IDCT into first and second one-dimensional IDCTs as well as the DCT. More specifically, applying variable x to F**(u, v) instead of variable u, intermediate results Ψ(x, v) are found by the following equation (6) indicating the first one-dimensional IDCT:

$$\varphi(x, v) = \sqrt{\frac{2}{N}} \sum_{u=0}^{N-1} C(u) F^{**}(u, v) \cos\left(\frac{\pi u(2x+1)}{2N}\right) \quad (6)$$

Then, applying variable y to the intermediate result $\Psi(x, v)$ instead of variable v, the transform value $f^{**}(x, y)$ is found by the second following equation (7) indicating the second one-dimensional IDCT.

$$f^{**}(x, y) = \sqrt{\frac{2}{N}} \sum_{v=0}^{N-1} C(v) \varphi(x, v) \cos\left(\frac{\pi v(2y+1)}{2N}\right) \quad (7)$$

Figure 10:
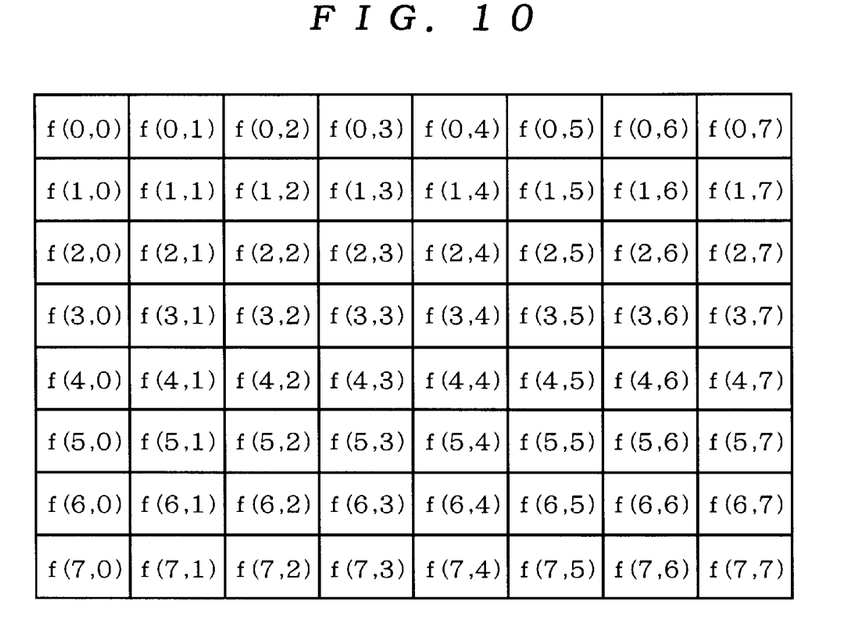
FIGS. 10 through 13 are schematic diagrams showing matrices employed in the conventional technique.
Figure 11:
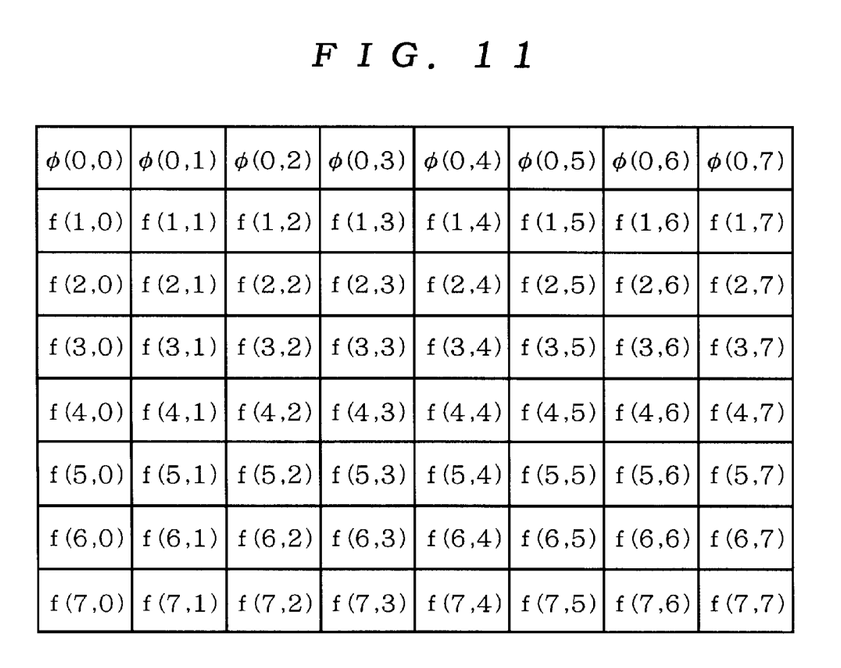
Figure 12:
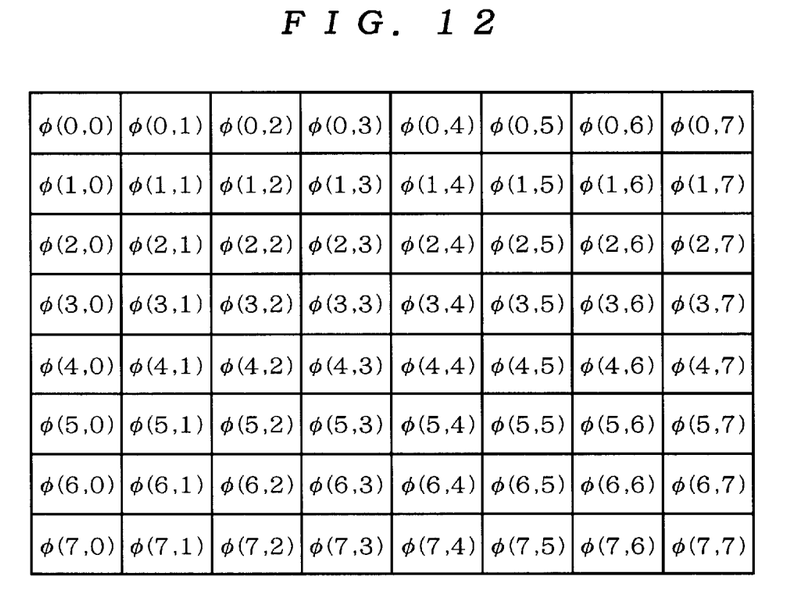

FIGS. 10 through 12 are schematic diagrams showing arrangements of the intermediate results $\phi(x, v)$. When the first one-dimensional DCT is performed along rows on the pixel values f(x, y) of a matrix shown in FIG. 10 to obtain the intermediate results $\phi(x, v)$, as is evident from the equation (3), only the pixel values in the xth row, f(x, 0), f(x, 1), ..., f(x, 7), are required for the DCT. Thus, once the intermediate results $\phi(x, 0), \phi(x, 1), ..., (x, 7)$ are obtained, the pixel values f(x, 0), f(x, 1), ..., f(x, 7) are no longer needed. From this, the intermediate results $\phi(x, v)$ can be arranged in the same matrix in place of the pixel values f(x, y) for the second one-dimensional DCT along columns.

FIG. 11 schematically shows that the intermediate results $\phi(0, 0), \phi(0, 1), ..., \phi(0, 7)$ are obtained from the pixel values in the 0th row, f(0, 0), f(0, 1), ..., f(0, 7), and are arranged in place of the pixel values f(0, 0), f(0, 1), ..., f(0, 7).

Figure 13:
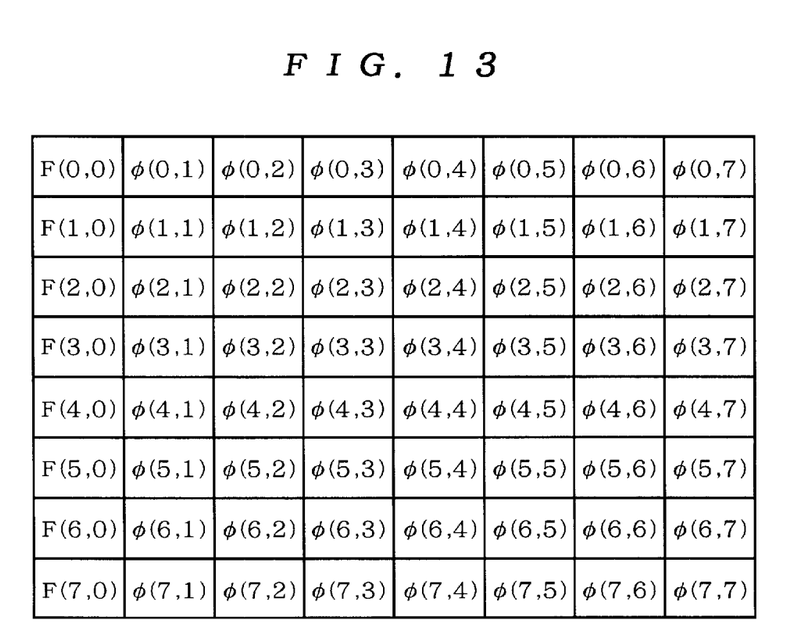

FIG. 12 further shows that the pixel values f(x, y) in all rows are likewise substituted by the intermediate results $\phi(x, v)$. Arranged in this way, the intermediate results $\phi(x, v)$ need to be read out along columns in the second DCT. This is because, as is evident from the equation (4), applying the variable x indicating a row as an adding parameter requires calculation of the sum of products in all rows in the vth column. FIG. 13 schematically shows that the transform values F(0, 0), F(1, 0), ..., F(7, 0) obtained from the intermediate results $\phi(0, 0), \phi(1, 0), ..., \phi(7, 0)$ are arranged.

Figure 14:
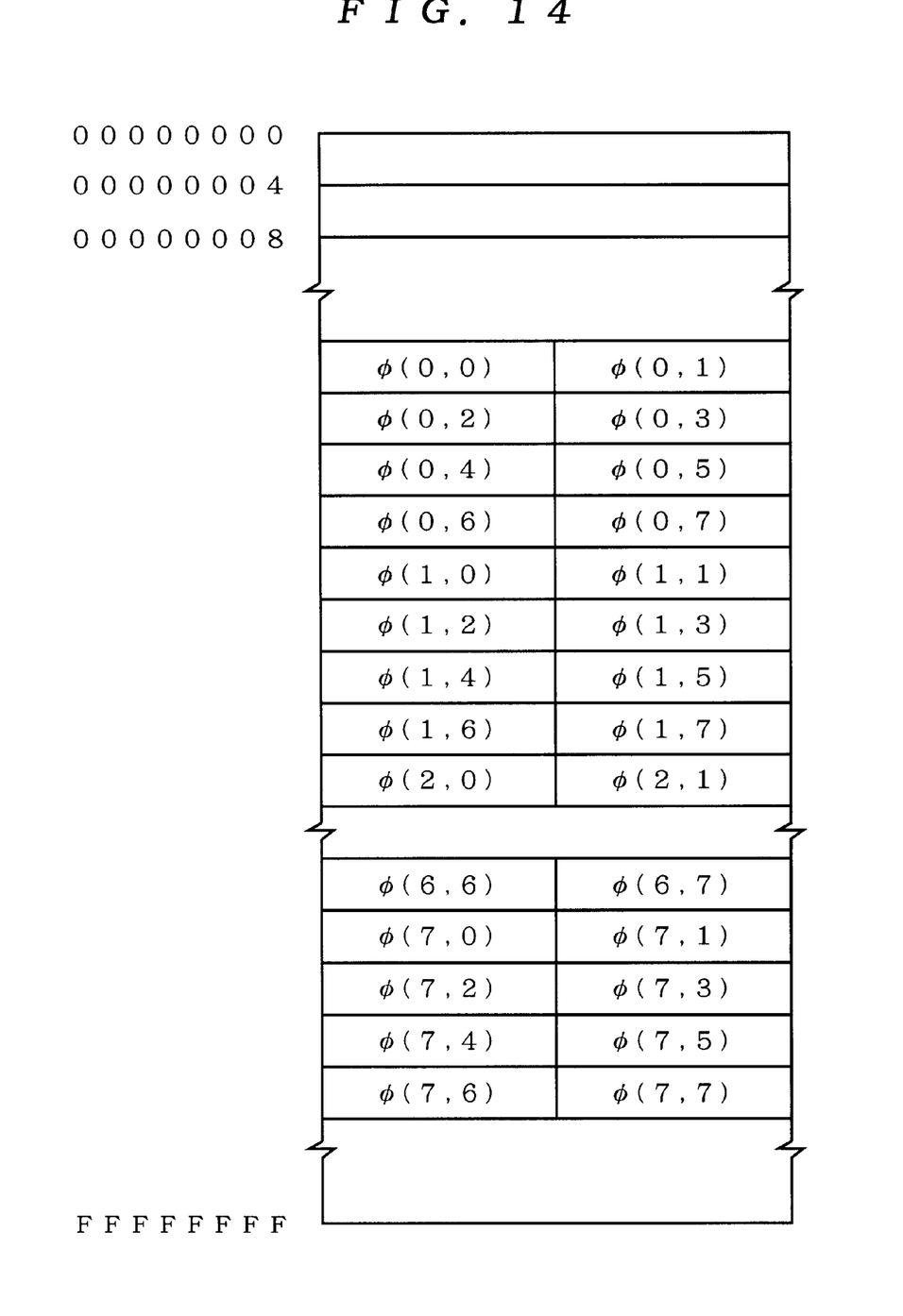
FIG. 14 is a schematic diagram showing correlation between arrangements in a matrix and storage in a memory.

FIG. 14 is a schematic diagram showing how the intermediate results $\phi(x,v)$ of a matrix as shown in FIG. 12 are stored in a memory space. In the specification, "arrangement" indicates how data is located in a matrix, and "storage" indicates that the data in a matrix is stored at a predetermined address in a memory.

In general, values in a matrix are stored in a memory space along each row. FIG. 14 shows how data is stored in a memory space displayed every hexadecimal 4 bytes when the size of the data is 16 bits, or 2 bytes.

As stored in a memory in this way, in order to obtain the transform values F(u, v), the intermediate results $\phi(x, v)$ have to be read out every 16 bytes, skipping data in between.

Of course, it might be possible to read all of the intermediate results $\phi(x, v)$ at a time by processing data in an 8×8 block with a customized exclusive memory. However, in a system built up with a generalized processor or memory such as a DRAM, calculation of an address is necessary for making a separate access to data in a memory space in each block of 16 bytes. Thus, it is difficult to read a plurality of the intermediate results $\phi(x, v)$ all together.

Secondly raised is complication of the zigzag scanning. The order of this scanning cannot be expressed by a simple equation, so that it is previously arranged in a table form within the memory. With reference to the table, an readout address is calculated and the quantized transform values F*(u, v) are read out. The same applies to the decoding. This kind of technique for specifying the order of the scanning with reference to a table has been, for example, introduced in a JPEG program of Independent JPEG Group distributed as a public domain program, or an MPEG1 decoder program of the University of California at Barcley.

When the order of the scanning is specified by such a table, the memory must be refereed to in two stages, first in referring to the table and second in reading out the quantized transform value F*(u, v) at an address specified by the table. This increases processing time. Especially, if there is waiting time in referring to the table, processing time is much more increased. Further, as the zigzag scanning makes an access to discontinuous addresses in a memory space, it is impossible to read a plurality of the quantized transform values F*(u,v) at a time. The same applies to the inverse zigzag scanning.

SUMMARY OF THE INVENTION

The present invention is directed to a data processing method. According to a first aspect of the present invention, the data processing method comprises the steps of: (a) processing an N×N first matrix, consisting of each N data to be processed arranged in every first and second directions, in every first direction by a first one-dimensional orthogonal transformation in order to obtain intermediate results, and obtaining an N×N second matrix by arranging the intermediate results, obtained in every first direction, in the second direction; and (b) obtaining transform values, forming an N×N third matrix, by processing the second matrix by a second one-dimensional orthogonal transformation in every first direction; and wherein a memory for storing the first and second matrices stores data arranged consecutively in the first direction, at consecutive addresses; and the first and second one-dimensional orthogonal transformations together serve as a two-dimensional orthogonal transformation for the data to be processed.

Preferably, according to a second aspect of the present invention, a coefficient data to be used for the second one-dimensional orthogonal transformation is arranged in the first direction in every block where the sum of products of the coefficient data and the intermediate results arranged in the first direction in the second matrix is calculated.

Preferably, according to a third aspect of the present invention, the coefficient data forms an N×N fourth matrix; and the third and fourth matrices form an N×2N fifth matrix, adjoining to each other in the first direction.

According to a fourth aspect of the present invention, the data processing method comprises the steps of: (a) processing an N×N first matrix, consisting of each N data to be processed arranged in every first and second direction, by a two-dimensional DCT in order to obtain $N^2$ transform values; and (b) obtaining an N×N second matrix by arranging a first of N arrays above in the second direction and a second of the N arrays below in the second direction, respectively, when the frequency components of the transform value at the end of the first of the N arrays arranged in the first direction is lower than that at the top of the second of the N arrays arranged in the first direction, the N arrays each consisting of N of the transform values arranged in the first direction in order of its frequency components from low to high, and wherein a memory for storing the first and second matrices stores data arranged consecutively in the first direction, at consecutive addresses.

Preferably, according to a fifth aspect of the present invention, the second matrix has zero run length defined by a plurality of the transform values adjoining to each other, and is encoded by entropy coding.

In the data processing method of the first aspect, the two-dimensional orthogonal transformation is divided into the two-step one-dimensional orthogonal transformation, and the results obtained from the first one-dimensional orthogonal transformation performed in every first direction are arranged in the second direction. Thus, not only the data to be processed in the first one-dimensional orthogonal transformation but also the intermediate results in the second one-dimensional orthogonal transformation can be read out in the first direction. Thus, the data consecutively arranged in the first direction can be read out consecutively or all together from the memory where the data is stored at consecutive addresses. This results in rapid processing.

In the data processing method of the second aspect, a block of the coefficient data arranged in the first direction is used to calculate the sum of products of itself and the intermediate results arranged in the first direction in the second matrix. Thus, in the second one-dimensional orthogonal transformation, the coefficient data can be read out consecutively or all together, resulting in rapid processing.

In the data processing method of the third aspect, the coefficient data as well as the intermediate results can be read out consecutively or all together in the second one-dimensional orthogonal transformation, resulting in rapid processing.

In the zigzag scanning, the transform values obtained by the two-dimensional DCT are arranged in one dimension in order of its frequency components from low to high. According to the fourth aspect, as arranged along rows in the second matrix in order of its frequency components from low to high, the transform values can be read out consecutively or all together. This results in rapid processing.

In the data processing method of the fifth aspect, zero run length is defined by consecutive readout of a plurality of the transform values, which results in rapid processing in entropy coding.

The present invention provides a technique for reading out a plurality of the intermediate results φ(x,v) at a time by relying on equivalence of the coefficients used in the two-step one-dimensional DCT, and further provides a technique for performing coding without the zigzag scanning.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
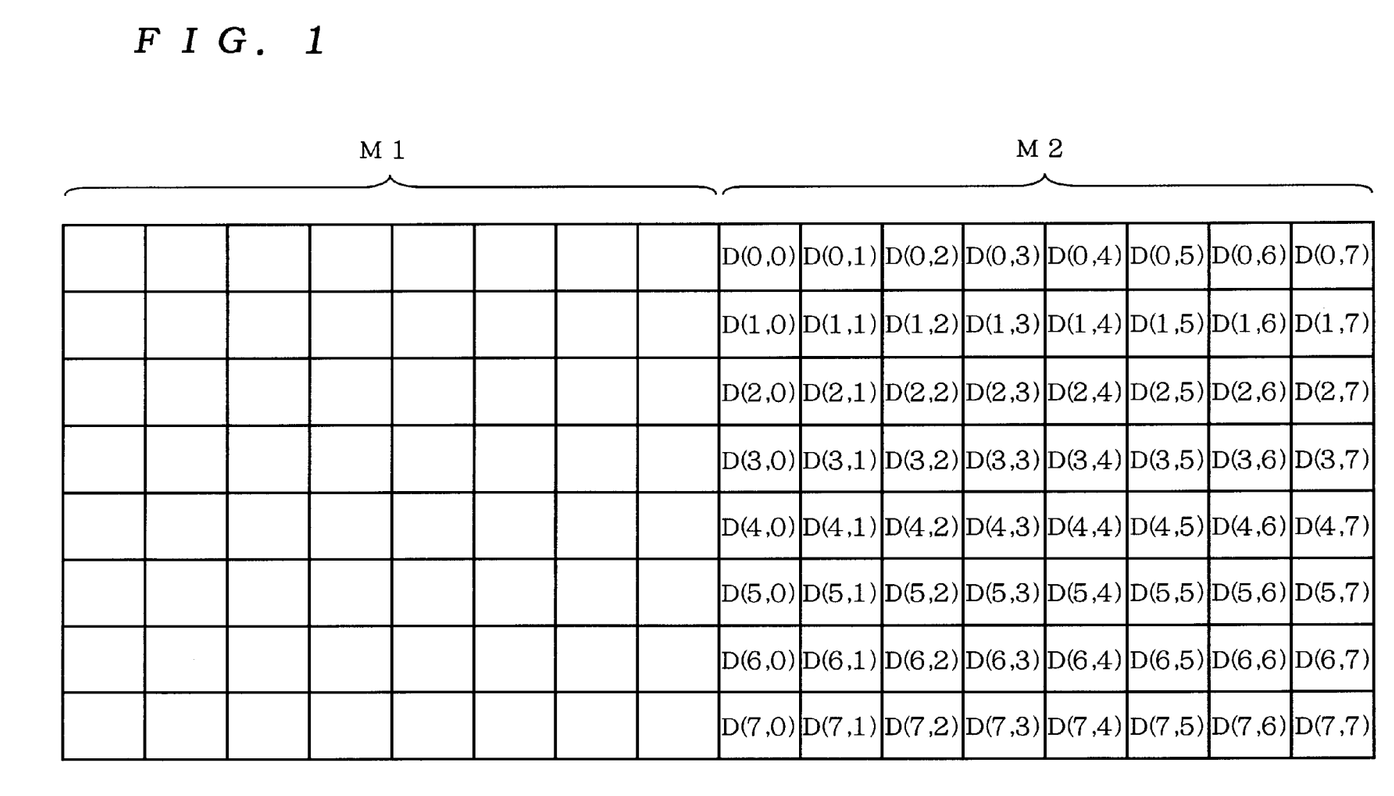
FIGS. 1 through 3 are schematic diagrams showing matrices employed in a first preferred embodiment of the present invention.

The present invention is applied to the structure shown in FIG. 8. FIG. 1 illustrates an 8×16 matrix employed in a DCT according to a first preferred embodiment of the present invention. An 8×8 matrix M1 on the left is blank, while an 8×8 matrix M2 on the right is filled with coefficients D(i, j) (i, j=0 to 7) provided as follows:

$$D(i, j) = C(i)\cos\left(\frac{\pi i(2j+1)}{2N}\right) \qquad (8)$$

In a first one-dimensional DCT performed on pixel values f(x, y) along rows, the coefficients in the matrix M2 are read out along rows. In this case, variables i, j correspond to variables v, y, respectively.

Intermediate results φ(0, v) are, for example, calculated from the pixel values f(0, 0), f(0, 1), ..., f(0, 7) and the coefficients D(v, 0), D(v, 1), ..., D(v, 7). The intermediate results φ(0, v) obtained in this way are arranged in the 0th column in the matrix M1. Likewise, the intermediate results φ(1, v) are calculated from the pixel values f(1, 0), f(1, 1), ..., f(1, 7) and the coefficients D(v, 0), D(v, 1), ..., D(v, 7), and are arranged in the first column in the matrix M1.

Figure 2:
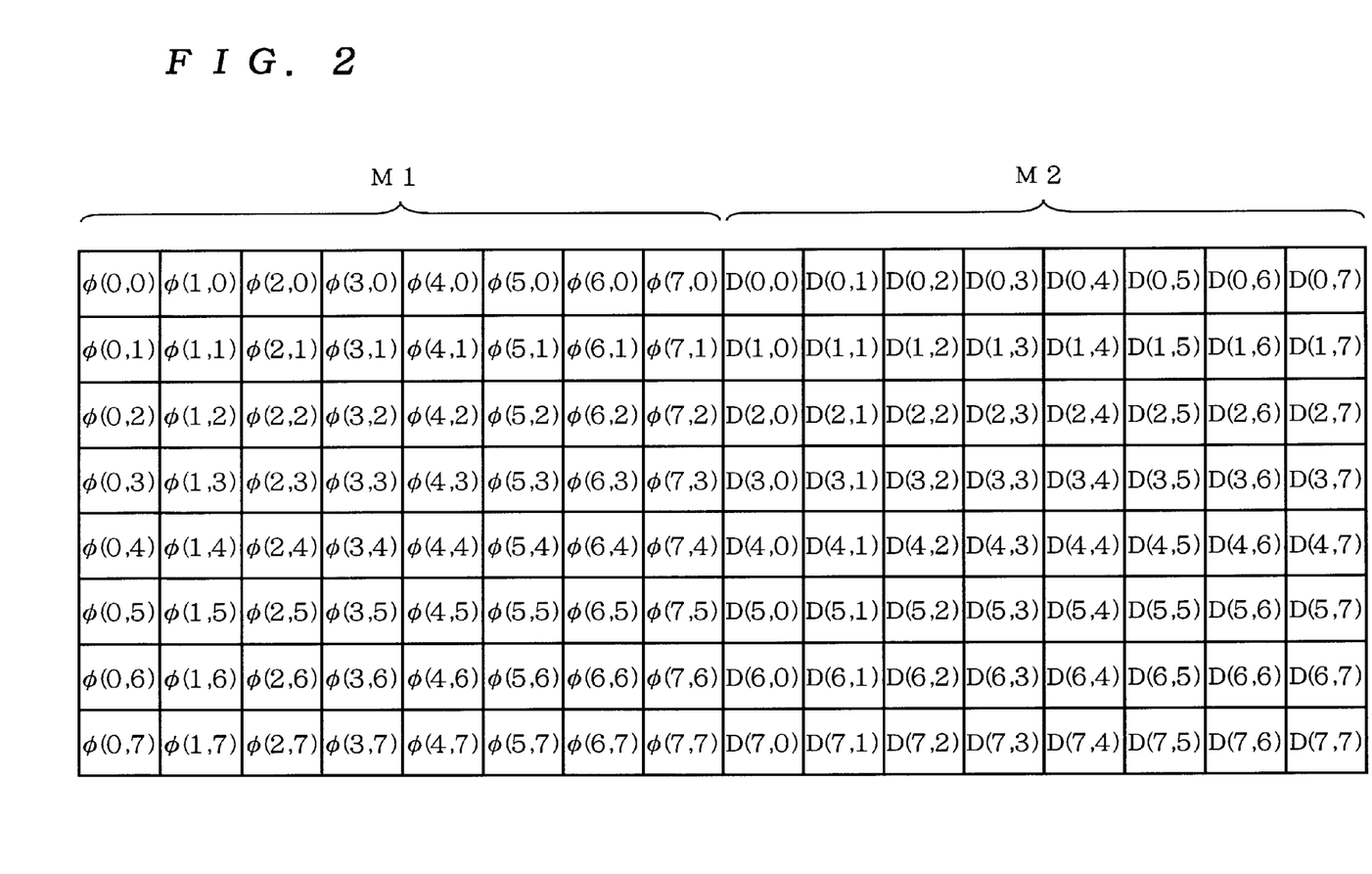

FIG. 2 schematically shows that the intermediate results φ(x, v) are arranged in the matrix M1 as described above. Arranged along columns in the new matrix M1, not rearranged in the matrix where the pixel values f(x, v) are arranged, the intermediate results φ(x, v) can be also read out along rows in a second one-dimensional DCT. That is, the intermediate results can be read out consecutively, or all together if the width of processable bits in hardware or software which performs the DCT is large enough. Further, as read out from the matrix M2 along rows for calculation, the coefficients D(i, j) can be read out at a time as well.

In this case, variables i, j correspond to variables u, x, respectively. Thus, the coefficients D(i, j) can be used both in the first and the second one-dimensional DCTs.

Figure 3:
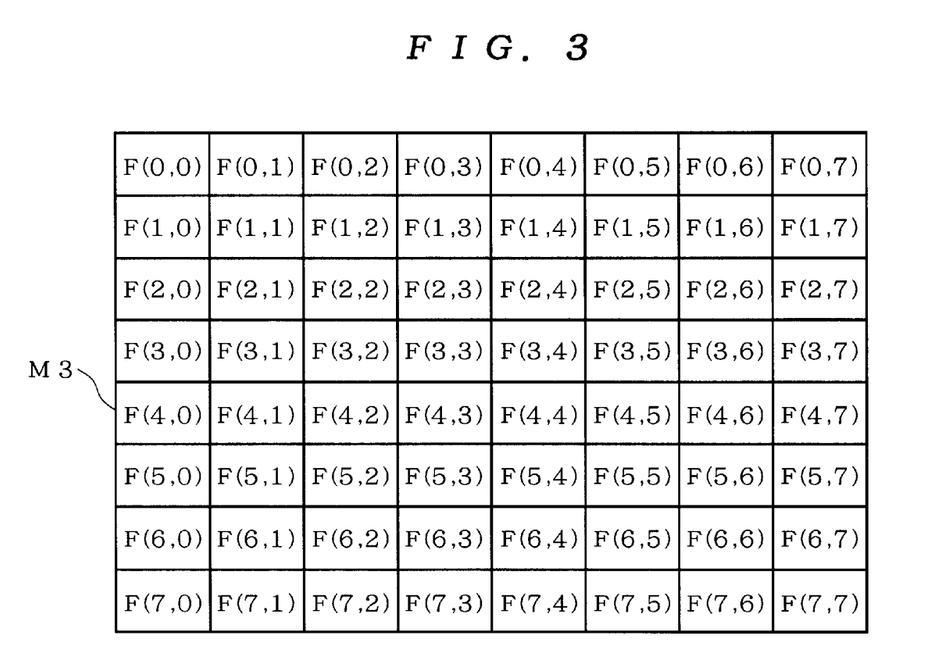

For example, transform values F(u, 0) are calculated from the intermediate results φ(0, 0), φ(1, 0), ..., φ(7, 0) and the coefficients D(u, 0), D(u, 1), ..., D(u, 7). The transform values F(u, 0) obtained in this way are arranged in the 0th column in the matrix where the pixel values f(x, y) are arranged. Likewise, the transform values F(u, 1) are calculated from the intermediate results φ(0, 1), φ(1, 1), ..., φ(7, 1) and the coefficients D(u, 0), D(u, 1), ..., D(u, 7), and are arranged in the first column in the matrix in place of the pixel values f(x, y). FIG. 3 shows a matrix M3 formed of such transform values F(u, v) arranged as described above. With this arrangement, the transform values F(u,v) can be processed in the same way with the conventional technique.

Especially, when u=v, necessary data is located in the same row both in the matrix M1 and M2. Thus, that data can be read out consecutively, or all together if the width of processable bits in hardware or software which performs the DCT is large enough.

According to this preferred embodiment as described above, the intermediate results φ(x, v) can be read out consecutively (or all together if the width of processable bits is large enough) in the second one-dimensional DCT by arranging them in a direction different from the pixel values f(x, y). Besides, as the coefficients used in the first and second one-dimensional DCTs are equivalent, the intermediate results φ(x, v) and the coefficients D(i, j) may be read out consecutively (or all together if the width of processable bits is large enough) with a probability of 1/N by placing the matrices of the intermediate results φ(x, v) and the coefficients D(i, j) side by side.

As the intermediate results φ(x, v) are arranged along columns, a write address is not consecutive However, each data is generally written one by one, so that it is unnecessary to consecutively deal with a plurality of data. Thus, non-consecutiveness of addresses in writing data causes no disadvantage in this preferred embodiment.

Further, though the specification only describes that elements in one row are stored at consecutive addresses within the memory space where elements of a matrix are stored, the same also applies to elements in one column. In that case, the terms "row" and "column" in the above description should be swapped. Further, it is obvious that the conventional technique for the memory space would not bring about the same effect with the present invention.

Second Preferred Embodiment

In the first preferred embodiment, the matrix M1 where the intermediate results φ(x,v) are arranged, and the matrix M2 where the coefficients D(i, j) are arranged, are separated right and left. The separation is not necessary if data necessary for the second one-dimensional DCT is arranged in the same row.

Figure 4:
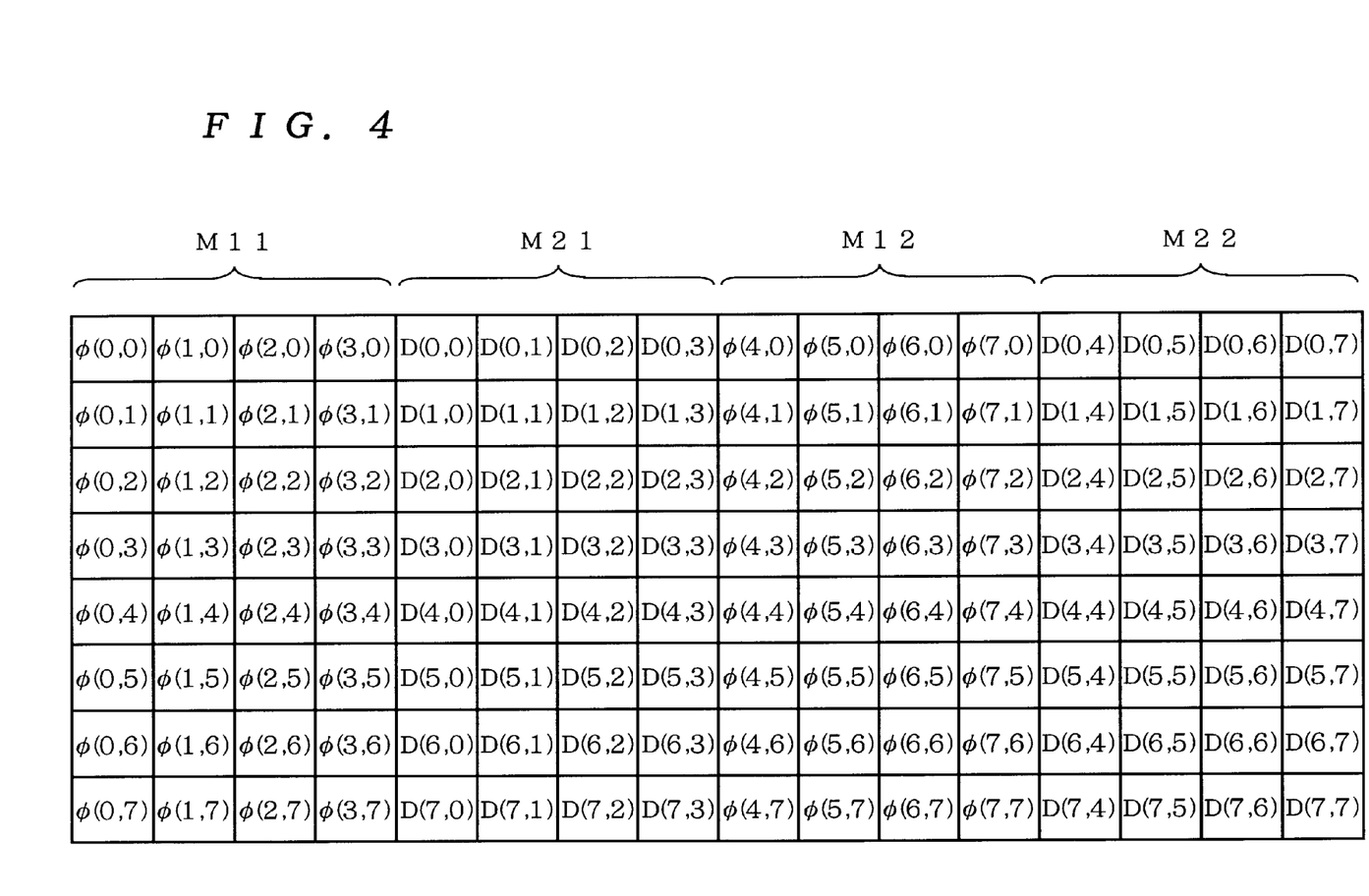
FIG. 4 is a schematic diagram showing a matrix employed in a second preferred embodiment of the present invention.

FIG. 4 shows a structure of matrices where the intermediate results φ(x, v) and the coefficients D(i, j) are arranged for a DCT according to a second preferred embodiment of the present invention. Two 4×8 matrices M11 and M12 correspond to the 8×8 matrix M1 of FIG. 2, and two 4×8 matrices M21 and M22 correspond to the 8×8 matrix M2 of FIG. 2. In FIG. 4, the matrix M21 is located between the matrices M11 and M12, and the matrix 12 between the matrices M21 and M22.

This structure is desirable when the width of processable bits is large enough to read data in one row at a time. As the matrices of the intermediate results φ(x, v) and the coefficients D(u, x) are divided and break into each other, when readout is performed only one by one, the data is, at least one time, discontinuously read out even in reading either one of them. However, if data in one row can be read out at a time, unnecessary data for process, such as the coefficients D(u,x) in reading the intermediate results φ(x,v) or the intermediate results φ(x,v) in reading the coefficients D(u,x), is only disused, not causing any inconvenience.

Further, in the second preferred embodiment, when u=v, data necessary for the second one-dimensional DCT is located in the same row as is the same case with the first preferred embodiment. Thus, the data can be consecutively read out.

Third Preferred Embodiment

Figure 5:
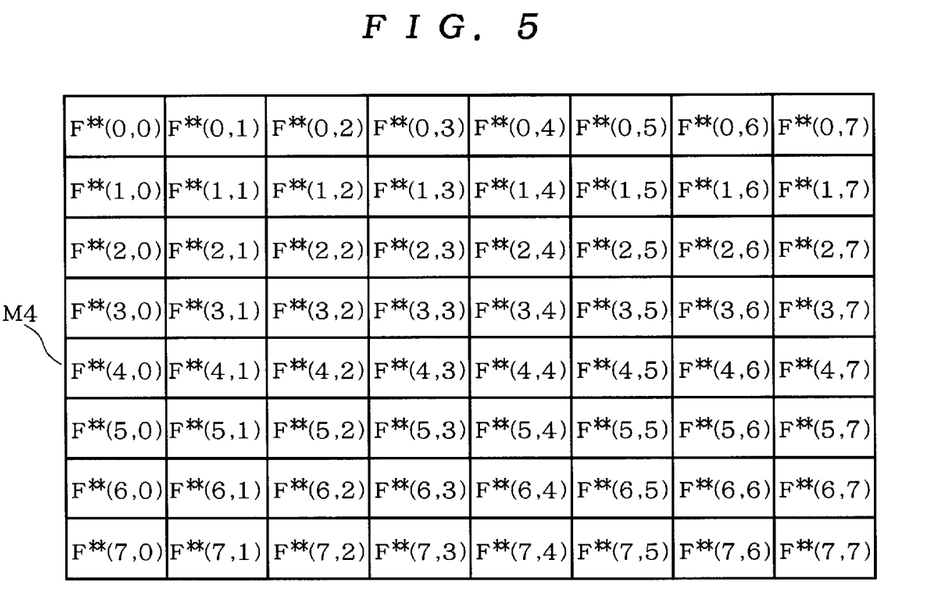
FIGS. 5 and 6 are schematic diagrams showing matrices employed in a third preferred embodiment of the present invention.

While the first preferred embodiment refers to the DCT in encoding, the same applies to an IDCT in decoding. The transform values F(u, v) shown in FIG. 3 goes through quantization, encoding, decoding and inverse quantization, and forms restored transform values F(u, v) which are to be processed in the IDCT. FIG. 5 shows a matrix M4 formed of the transform values F(u,v).

As is evident from the equation (6), the intermediate results φ(x,v) are generally obtained by a first one-dimensional IDCT, requiring the transform values F(0, v), F(1, v), ..., F**(N−1, v). However, these values are arranged along a column as shown in FIG. 5, so that consecutive readout is impossible.

Therefore, in this preferred embodiment, the two-step one-dimensional IDCT expressed by the equations (6) and (7) is substituted by that expressed by the following equations (9) and (10). From orthogonality of DCT, both consecutive processing according to the equations (6), (7) and according to the equations (9), (10) are obviously equivalent to the two-dimensional DCT expressed by the equation (5).

$$\psi(u, y) = \sqrt{\frac{2}{N}} \sum_{v=0}^{N-1} C(v) F^{**}(u, v) \cos\left(\frac{\pi v(2y+1)}{2N}\right) \quad (9)$$

$$f^{**}(x, y) = \sqrt{\frac{2}{N}} \sum_{u=0}^{N-1} C(u) \psi(u, y) \cos\left(\frac{\pi u(2x+1)}{2N}\right) \quad (10)$$

In this case, the transform values f**(x,y) are obtained from the equation (10) after the intermediate results Ψ(u,y) are obtained from the equation (9).

The transform values necessary for obtaining the intermediate results Ψ(u,y) are F(u, 0), F(u, 1), ..., F**(u, N−1). Arranged along rows as is evident from FIG. 5, those values can be read out consecutively or all together.

Figure 6:
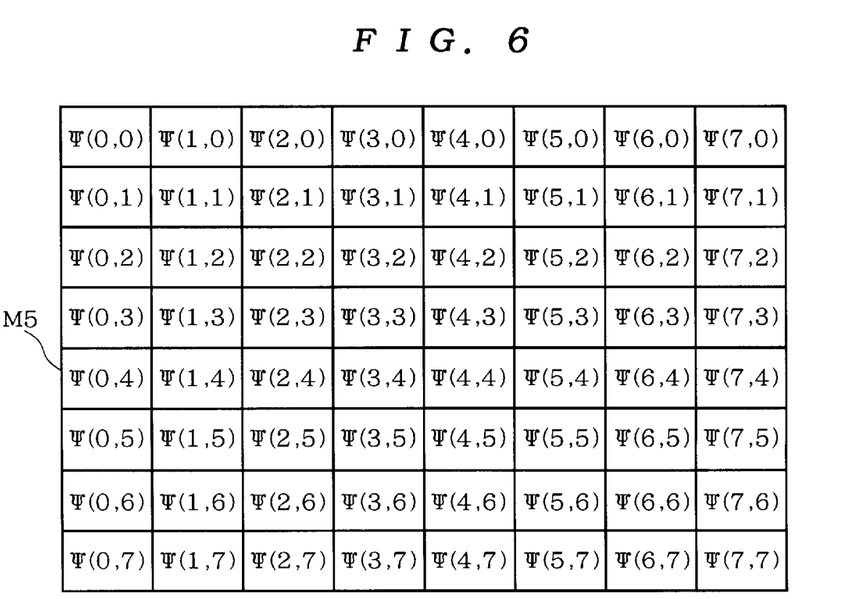

FIG. 6 schematically shows a matrix M5 where the intermediate results Ψ(u, y) are arranged in the yth row and the uth column. With the intermediate results Ψ(u, y) arranged in this way, the intermediate results Ψ(0, y), Ψ(1, y), ..., Ψ(N−1, y), necessary for obtaining the transform values f**(x,y), can be arranged along rows. Thus, data can be read out consecutively or all together in the second one-dimensional IDCT.

The coefficients necessary for obtaining the transform values f(x, y) are D(0, x), D(1, x), ..., D(N−1, x). Thus, these coefficients are arranged in the same row with the intermediate results Ψ(0, y), Ψ(1, y), ..., Ψ(N−1, y) so that data necessary for obtaining f(x, y) can be read out consecutively or all together. That is, the use of the matrix M5 in place of the matrix M1 of FIG. 2 enables a quick readout.

Of course, if the matrices M2 and M5 are divided in a specific column, respectively, to break into each other, the same effect with the second preferred embodiment can be obtained.

Fourth Preferred Embodiment

The zigzag scanning is performed so that the transform values F(u, v) obtained by the DCT are arranged in one-dimension in order of its frequency components from low to high. Thus, when the transform values F(u, v) are arranged in an N×N matrix for quantization, they are arranged in the 0th row and the 0th column, ..., the 0th row and the (N−1)th column, the first row and the 0th column, ..., the first row and the (N−1)th column, ..., the (N−1)the row and the 0th column, ..., the (N−1)th row and the (N−1)the column, respectively, in order of its frequency components from low to high. This eliminates the need for the zigzag scanning.

Figure 7:
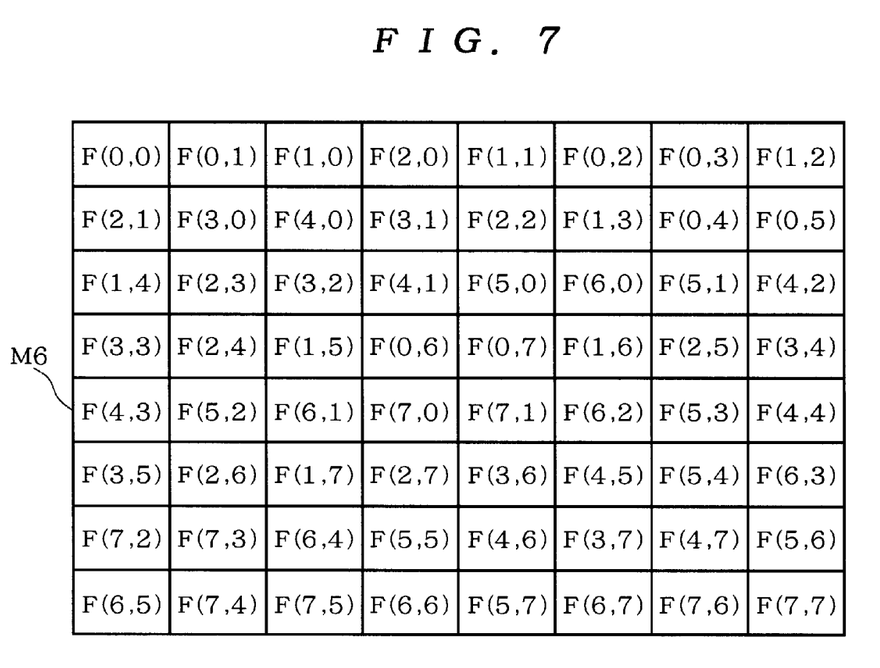
FIG. 7 is a schematic diagram showing a matrix employed in a fourth preferred embodiment of the present invention.

FIG. 7 schematically shows an 8×8 matrix M6 formed of such transform values F(u, v). Obviously, sequential readout of this matrix M6 along rows can produce the same one-dimensional array obtained by reading the matrix M3 of FIG. 3 with the zigzag scanning as shown in FIG. 9.

Therefore, the zigzag scanning becomes unnecessary in coding, which makes it possible to read many of the quantized transform values F*(u, v) consecutively or all together. Excision of the zigzag scanning eases acquisition of zero run length in coding. When one of the pixel data needs 16 bits for processing, for example, a comparator for comparing a 32-bit data with zero consecutively read out two transform values F*(u, v). In accordance with the arrangements shown in FIG. 7, a change has to be made in the quantization table 301 for quantization.

Further, the matrix shown in FIG. 7 may be obtained by converting the transform values F(u, v) once stored on the basis of the matrix shown in FIG. 3 or by arranging them one by one when they are obtained.

While the invention has been described in detail, the foregoing description is in all aspects illustrative and not restrictive. It is understood that numerous other modifications and variations can be devised without departing from the scope of the invention.

I claim:

1. A data processing method comprising the steps of:
   (a) processing an N×N first matrix, consisting of each N data to be processed arranged in every first and second directions, in every first direction by a first one-dimensional orthogonal transformation in order to obtain intermediate results, and obtaining an N×N second matrix by arranging said intermediate results, obtained in every first direction, in said second direction; and
   (b) obtaining transform values, forming an N×N third matrix, by processing said second matrix by a second one-dimensional orthogonal transformation in every first direction;
   wherein:
   a memory for storing said first and second matrices stores data arranged consecutively in said first direction, at consecutive addresses; and
   said first and second one-dimensional orthogonal transformations together serve as a two-dimensional orthogonal transformation for said data to be processed.

2. The data processing method of claim 1, wherein said data to be processed is an image data.

3. The data processing method of claim 1, wherein N=8.

4. The data processing method of claim 1, wherein said first and second one-dimensional orthogonal transformations are both one-dimensional DCTs.

5. The data processing method of claim 1, wherein said first and second one-dimensional orthogonal transformations are both one-dimensional IDCTs.

6. The data processing method of claim 1, wherein a coefficient data to be used for said second one-dimensional orthogonal transformation is arranged in said first direction in every block where the sum of products of said coefficient data and said intermediate results arranged in said first direction in said second matrix is calculated.

7. The data processing method of claim 6, wherein said coefficient data is also used in said first one-dimensional orthogonal transformation.

8. The data processing method of claim 6, wherein said coefficient data forms an N×N fourth matrix; and said third and fourth matrices form an N×2N fifth matrix, adjoining to each other in said first direction.

9. The data processing method of claim 8, wherein said third and fourth matrices are divided along said second direction, and break into each other.

10. A data processing method comprising the steps of:
    (a) processing an N×N first matrix, consisting of each N data to be processed arranged in every first and second direction, by a two-dimensional DCT in order to obtain $N^2$ transform values;
    (b) obtaining an N×N second matrix by arranging a first one of N arrays and a second one of N arrays such that said first one of N arrays is above said second one of N arrays in said second direction and said second one of said N arrays is below said first one of said N arrays in said second direction, respectively, when the frequency components of a transform value found at a last element of said first one of said N arrays arranged in said first direction is lower than that found at a first element of said second one of said N arrays arranged in said first direction, said N arrays each consisting of N of said $N^2$ transform values obtained in step (a), arranged in said first direction in order of its frequency components from low to high; and
    (c) storing said first and second matrices in a memory, wherein said memory for storing said first and second matrices stores data arranged consecutively in said first direction, at consecutive addresses.

11. The data processing method of claim 10, further comprising the step of:
    quantizing said second matrix with a predetermined quantization coefficient.

12. The data processing method of claim 10, further comprising the step of:
    encoding said second matrix by entropy encoding, wherein said second matrix has zero run length defined by a plurality of said transform values adjoining to each other.

13. The data processing method of claim 12, wherein said entropy coding is Huffman coding.

14. A data processing apparatus comprising:
    a memory for storing a first matrix value whose rows are respectively stored in different memory areas each having consecutive addresses, and
    a daa processor including a processing unit, said processing unit receiving said first matrix value from said memory, calculating a second matrix value whose rows are respectively calculated using different rows of said first matrix value, outputting said second matrix value from said memory, receiving said second matrix value from said memory, and calculating a third matrix values whose rows are respectively calculated using different columns of said second matrix value, wherein said memory stores columns of said second matrix value respectively stored in different memory areas, each memory area having consecutive addresses.

15. The data processing apparatus of claim 14, wherein said data processor comprises:
    a quantizer for input data and outputting quantized data, and
    and encoding unit for entropy encoding the quantized data output from said quantizer, wherein
    said processing unit is a DCT unit for performing a two-dimensional DCT on said first matrix value representing image data to calculate said third matrix value representing transformed image data, said quantizer receiving the transformed image as the input data.

16. The data processing apparatus of claim 14, wherein said data processor further comprises:
    a decoder for decoding compressed image data and outputting decoded data, the compressed data bieng entropy encoded image data, and
    an inverse quantization unit for inversely quantizing the decoded data output from said decoder and outputting inversely quantized data, wherein said processing unit is an inverse DCT unit for performing a two-dimensional inverse DCT on said first matrix value representing the inversely quantized data to calculate said third matrix value.

17. The data processing apparatus of claim 14, wherein said data processor also received a fourth matrix value from said memory and calculates elements of each row of said third matrix value using one column of said second matrix and respective rows of said fourth matrix value, said data processor storing rows of said fourth matrix, respectively, in the memory areas where the columns of said second matrix value are respectively stored.

18. The data processing apparatus of claim 17, wherein
data processor also calculates each column of said second matrix value further using said fourth matrix value.

19. The data processing apparatus of claim 17, wherein
said data processor divides each column of said second matrix value into a plurality of first groups and each row of said fourth matrix value into a plurality of second groups, and stores plurality of first groups and said plurality of second groups alternately in the memory area.

a memory for storing $N^2$ first values, and a data processor receiving said $N^2$ first values from said memory for performing a two-dimensional DCT on said $N^2$ first values to obtain $N^2$ second values respectively corresponding to frequency components, said memory storing said $N^2$ second values in a memory having consecutive addresses in order of the frequency components, and said data processor receives said $N^2$ second values from said memory and performs a quantization on said $N^2$ second values.

20. A data processing apparatus comprising:

a memory for storing $N^2$ first values, and a data processor receiving said $N^2$ first values from said memory for performing a two-dimensional DCT on said $N^2$ first values to obtain $N^2$ second values respectively corresponding to frequency components, said memory storing said $N^2$ second values in a memory area having consecutive addresses in order of the frequency components, and said data processor receives said $N^2$ second values from said memory and performs a quantization on said $N^2$ second values.

21. A data processing apparatus comprising:

a memory for storing a first matrix value whose rows are respectively stored in different memory areas each having consecutive addresses, and a data processor including means for receiving said first matrix value from said memory, calculating a second matrix value whose rows are respectively calculated using different rows of said first matrix value, and outputtig said second matrix value to said memory, said memory storing columns of said second matrix value respectively in different memory areas, each memory area having consecutive addresses, wherein said data processor further includes means for receiving said second matrix value from said memory and calculating a third matrix values whose rows are respectively calculated using different columns of said matrix value.

22. The data processing apparatus of claim 21, wherein said data processor comprises:

a quantizer for quantizing input data and outputting quantized data, and an encoding unit for entropy encoding the quantized data output from said quantizer, wherein said means for receiving said first matrix value and said means for receiving said second value are a DCT unit for performing a two dimensional DCT on said first matrix value representing image data to calculate said third matrix value representing transformed image data, said quantizer receiving the transformed image as the input data.

23. The data processing apparatus of claim 21, wherein said data processor further comprises:

a decoder for decoding a compressed image data and outputting decoded data, the compressed data being entropy encoded image data, and an inverse quantization unit for inversely quantizing the decoded data output from said decoder and outputting inversely quantizing the decoded data output from said decoder and outputting inversely quantizer data, wherein said means for receiving said first matrix value and said means for receiving said second matrix value are an inverse DCT unit for performing a two-dimensional inverse DCT on said first matrix value representing the inversely quantizied data to calculate said third matrix value.

24. The data processing apparatus of claim 21, wherein
said data processor comprises means for receiving a fourth matrix value from said memory and calculating elements of each of said third matrix value using one column of said second matrix and respective rows of said fourth matrix value, and means for storing, respectively, rows of said fourth matrix in the memory areas where the columns of said second matrix value are respectively stored.

25. The data processing apparatus of claim 24, wherein
said data processor further comprises means for calculating each column of said second matrix value further using said fourth matrix value.

26. The data processing apparatus of claim 24, wherein
said data processor further comprises means for driving each column of said second matrix value into a plurality of first groups and each row of said fourth matrix value into a plurality of second groups, and means for storing said plurality of first groups and said plurality of second groups alternately in the memory area.

27. A data processing apparatus comprising:

a memory for storing $N^2$ first values, and a data processor including means for receiving sadi $N^2$ first values from said memory for performing a two-dimensional DCT on said $N^2$ first values to obtain $N^2$ second values respectively corresponding to frequency components, said memory storing said $N^2$ second values in a memory area having consecutive addresses in order of the frequency components, and said data processor further includes means for receiving said $N^2$ second values from said memory and means for performing a quantization on said $N^2$ second values.

* * * * *